US012810893B2

(12) United States Patent
Tada et al.

(10) Patent No.: US 12,810,893 B2
(45) Date of Patent: Nov. 24, 2026

(54) MAGNETIC RECORDING MEDIUM, MAGNETIC TAPE CARTRIDGE, AND MAGNETIC RECORDING AND REPRODUCING DEVICE

(71) Applicant: FUJIFILM Corporation, Tokyo (JP)

(72) Inventors: Toshio Tada, Minamiashigara (JP); Hiroyuki Suzuki, Minamiashigara (JP); Megumi Nakano, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 462 days.

(21) Appl. No.: 18/187,017

(22) Filed: Mar. 21, 2023

(65) Prior Publication Data

US 2023/0306995 A1 Sep. 28, 2023

Related U.S. Application Data

(63) Continuation of application No. PCT/JP2021/034159, filed on Sep. 16, 2021.

(30) Foreign Application Priority Data

Sep. 30, 2020 (JP) ................................ 2020-165777

(51) Int. Cl.
*G11B 5/708* (2006.01)
*G11B 5/72* (2006.01)
*G11B 5/78* (2006.01)

(52) U.S. Cl.
CPC ................ *G11B 5/708* (2013.01); *G11B 5/72* (2013.01); *G11B 5/78* (2013.01)

(58) Field of Classification Search
CPC ....... G11B 5/70678; G11B 5/708; G11B 5/72; G11B 5/78; G11B 23/107
See application file for complete search history.

(56) References Cited

U.S. PATENT DOCUMENTS

2003/0091866 A1 5/2003 Ejiri et al.
2005/0048323 A1* 3/2005 Zinbo ................ G11B 5/70678
2015/0111066 A1 4/2015 Terakawa et al.
2016/0293196 A1* 10/2016 Sato ....................... G11B 5/714
2018/0286446 A1* 10/2018 Ozawa ..................... G11B 5/70
2020/0251140 A1 8/2020 Ozawa et al.
2020/0302962 A1 9/2020 Sawayashiki et al.

FOREIGN PATENT DOCUMENTS

JP 2002-358630 A 12/2002
JP 2015-82329 A 4/2015
JP 2020-126704 A 8/2020
JP 2020-155190 A 9/2020

OTHER PUBLICATIONS

Bhushan, Nanotribology and Nanomechanics an Introduction, Springer, 2nd Edition, p. 1137-1197, 2008.*
English Machine Translation: Ozawa et al. (JP 2020009522).*
Office Action dated Aug. 8, 2023, issued in Japanese Application No. 2020-165777.
International Search Report dated Dec. 7, 2021 issued in International Application No. PCT/JP2021/034159.
Written Opinion dated Dec. 7, 2021 issued in International Application No. PCT/JP2021/034159.
International Preliminary Report on Patentability dated Mar. 28, 2023 with a Translation of the Written Opinion of the International Searching Authority in Application No. PCT/JP2021/034159.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The magnetic recording medium is used in a magnetic recording and reproducing device in which a reproduction bit size S is 40,000 $nm^2$ or less, and a numerical value of a residual magnetic flux density $Br_{vertical}$, which is expressed in a unit G, in a vertical direction of the magnetic recording medium is X or more. The X is a value calculated as X=−0.01S+1550.

8 Claims, No Drawings

MAGNETIC RECORDING MEDIUM, MAGNETIC TAPE CARTRIDGE, AND MAGNETIC RECORDING AND REPRODUCING DEVICE

CROSS-REFERENCE TO RELATED APPLICATIONS

This application is a Continuation of PCT International Application No. PCT/JP2021/034159 filed on Sep. 16, 2021, which claims priority under 35 U.S.C. § 119(a) to Japanese Patent Application No. 2020-165777 filed on Sep. 30, 2020. Each of the above applications is hereby expressly incorporated by reference, in its entirety, into the present application.

BACKGROUND OF THE INVENTION

1. Field of the Invention

The present invention relates to a magnetic recording medium, a magnetic tape cartridge, and a magnetic recording and reproducing device.

2. Description of the Related Art

A magnetic recording medium has been widely used as a data storage recording medium for recording and storing various pieces of data (see, for example, JP2015-82329A).

SUMMARY OF THE INVENTION

JP2015-82329A proposes controlling a product Mrt (that is, residual magnetization per unit area) of residual magnetization Mr and a thickness t of a magnetic layer of a magnetic recording medium in order to obtain a high signal-to-noise ratio (carrier-to-noise ratio (CNR)) (see paragraph 0014 of JP2015-82329A).

Examples of means for increasing a capacity of the magnetic recording medium include increasing a recording density by reducing a size of one bit. However, in a case where the size of one bit is reduced, a signal intensity output from one bit is reduced and an output shortage becomes apparent, so that it is difficult to improve electromagnetic conversion characteristics by the means in the related art as proposed in JP2015-82329A.

An object of one aspect of the present invention is to provide a magnetic recording medium capable of exhibiting excellent electromagnetic conversion characteristics in a small bit size region.

One aspect of the present invention relates to a magnetic recording medium comprising: a non-magnetic support; and a magnetic layer containing a ferromagnetic powder, in which the magnetic recording medium is used in a magnetic recording and reproducing device in which a reproduction bit size S is 40,000 $nm^2$ or less, a numerical value of a residual magnetic flux density $Br_{vertical}$, which is expressed in a unit G (Gauss), in a vertical direction of the magnetic recording medium is X or more, and the X is a value calculated as $X=-0.01S+1550$.

In addition, one aspect of the present invention relates to a magnetic recording and reproducing device, in which a reproduction bit size S is 40,000 $nm^2$ or less, a magnetic recording medium that includes a non-magnetic support and a magnetic layer containing a ferromagnetic powder is provided, a numerical value of a residual magnetic flux density $Br_{vertical}$, which is expressed in a unit G, in a vertical direction of the magnetic recording medium is X or more, and the X is a value calculated as $X=-0.01S+1550$.

In one embodiment, the residual magnetic flux density $Br_{vertical}$ may be 1200 G or more.

In one embodiment, a thickness of the magnetic layer may be 50.0 nm or less.

In one embodiment, the ferromagnetic powder may be a hexagonal strontium ferrite powder.

In one embodiment, the ferromagnetic powder may be a hexagonal barium ferrite powder.

In one embodiment, the magnetic recording medium may further comprise a non-magnetic layer containing a non-magnetic powder between the non-magnetic support and the magnetic layer.

In one embodiment, the magnetic recording medium may further comprise a back coating layer containing a non-magnetic powder on a surface side of the non-magnetic support opposite to a surface side on which the magnetic layer is provided.

In one embodiment, the magnetic recording medium may be a magnetic tape.

Another aspect of the present invention relates to a magnetic tape cartridge comprising the magnetic tape.

According to one aspect of the present invention, it is possible to provide a magnetic recording medium capable of exhibiting excellent electromagnetic conversion characteristics in a small bit size region. In addition, according to one aspect of the present invention, it is possible to provide a magnetic tape cartridge and a magnetic recording and reproducing device including the magnetic recording medium.

DESCRIPTION OF THE PREFERRED EMBODIMENTS

[Magnetic Recording Medium and Magnetic Recording and Reproducing Device]

One aspect of the present invention relates to a magnetic recording medium including a non-magnetic support, and a magnetic layer containing a ferromagnetic powder. The magnetic recording medium is used in a magnetic recording and reproducing device in which a reproduction bit size S is 40,000 $nm^2$ or less, and a numerical value of a residual magnetic flux density $Br_{vertical}$, which is expressed in a unit G, in a vertical direction of the magnetic recording medium is X or more. The X is a value calculated as $X=-0.01S+1550$.

One aspect of the present invention relates to a magnetic recording and reproducing device. In the magnetic recording and reproducing device, the reproduction bit size S is 40,000 $nm^2$ or less. The magnetic recording and reproducing device includes a magnetic recording medium that includes a non-magnetic support, and a magnetic layer containing a ferromagnetic powder. The numerical value of the residual magnetic flux density $Br_{vertical}$, which is expressed in the unit G, in the vertical direction of the magnetic recording medium is the X or more.

In the present invention and the present specification, the "reproduction bit size S" is calculated from a linear recording density and a reproducing element width in recording and reproduction on the magnetic recording medium. As an example, a method of calculating the reproduction bit size will be described below, using a case where the linear recording density is 510 kbpi as an example.

Regarding the unit, "k (kilo) bpi" is a unit that cannot be converted into an SI unit, and "bpi" means "bit per inch". Therefore, 510 kbpi means that the number of bits recorded per inch, that is, 25.4 mm is 510,000 bits. Since 510,000 bits are recorded in a length of 25,400,000 nm, for example, in a tape-shaped magnetic recording medium (that is, a magnetic tape), a recording bit length per bit in a longitudinal direction of the magnetic tape is calculated as follows: recording bit length per bit=25,400,000 nm/510,000 (=about 49.8 nm). As an example, in a case where the reproducing element width is 0.5 m (that is, 500 nm), the reproduction bit size S is calculated as follows: S=(25,400,000 nm/510,000)×500 nm=24,902 nm$^2$. In the above description, the case of the magnetic tape has been described as an example. Similarly, for a disk-shaped magnetic recording medium (that is, a magnetic disk), the reproduction bit size S can be obtained from the linear recording density and the reproducing element width. The term "reproducing element width" means a physical dimension of the reproducing element width. Such a physical dimension can be measured by an optical microscope, a scanning electron microscope, or the like.

As described above, in a case where the linear recording density and the reproducing element width in the recording and reproduction on the magnetic recording medium are determined, a reproduction bit width can be calculated. In a case where a magnetic recording and reproducing device (generally referred to as a "drive") to which the magnetic recording medium is applied is determined, the linear recording density and the reproducing element width are naturally determined as intrinsic values of recording and reproducing in such a magnetic recording and reproducing device. The magnetic recording and reproducing device to which the magnetic recording medium is applied is determined by a standard name given in a case where the magnetic recording medium is marketed. For example, the magnetic tape is usually marketed in a form of a magnetic tape cartridge (also referred to as a data cartridge). As an example, in a case where the magnetic tape is marketed as a "Linear Tape-Open (LTO) Ultrium 8 Data Cartridge", the magnetic tape in the magnetic tape cartridge is a magnetic tape applied to the magnetic recording and reproducing device according to "LTO Ultrium 8", one of the industry standards.

In the present invention and the present specification, the residual magnetic flux density $Br_{vertical}$ in the vertical direction of the magnetic recording medium is a value obtained by dividing residual magnetization per unit area of the magnetic recording medium (hereinafter, referred to as "vertical residual magnetization") by a thickness of the magnetic layer, which is measured in the vertical direction of the magnetic recording medium. The term "vertical direction" described regarding the residual magnetization refers to a direction orthogonal to a magnetic layer surface, and can also be referred to as a thickness direction of the magnetic layer. In the present invention and the present specification, the magnetic layer surface has the same meaning as a surface of the magnetic recording medium on a magnetic layer side. The vertical residual magnetization is a value obtained by sweeping an external magnetic field in the vertical direction (direction orthogonal to the magnetic layer surface) of a sample piece cut out from a randomly selected position of the magnetic recording medium to be measured at a measurement temperature of 23° C.±1° C. under the conditions of a maximum external magnetic field of 1194 kA/m (15 kOe) and a scanning speed of 4.8 kA/m/sec (60 Oe/sec) in a vibrating sample magnetometer. Regarding the unit, 1 Oe (oersted)=79.6 A/m. A size of the sample piece need only be any size appropriate for being introduced into a vibrating sample magnetometer used for the measurement. The measured value is obtained as a value obtained by subtracting magnetization of a sample probe of a vibrating sample magnetometer as background noise. The measurement temperature is a temperature of the sample piece. By setting an atmosphere temperature around the sample piece to the measurement temperature, the temperature of the sample piece can be set to the measurement temperature by establishing a temperature equilibrium. In a case where the vertical residual magnetization is obtained as a value in the unit "G·nm", the residual magnetic flux density $Br_{vertical}$ in the vertical direction of the magnetic recording medium can be obtained as the value in the unit "G" by dividing the obtained value by the magnetic layer thickness (unit: nm). In a case where the vertical residual magnetization is obtained as a value in the unit "G m", the residual magnetic flux density $Br_{vertical}$ in the vertical direction of the magnetic recording medium can be obtained as the value in the unit "G" by dividing the obtained value by the magnetic layer thickness (unit: μm).

The thickness of the magnetic layer is obtained by the following method. A cross-sectional sample is produced at a randomly selected position of the magnetic recording medium to be measured. The cross-sectional sample is prepared such that the magnetic layer is included in the entire range in the length direction and an interface between the magnetic layer surface and a portion adjacent to the magnetic layer (for example, a non-magnetic layer described below) is included in the thickness direction. A cross-sectional image is acquired by observing the cross-sectional sample at 7 randomly selected locations with a scanning electron microscope (SEM) at a magnification of 50,000×. As the SEM, a field emission-scanning electron microscope (FE-SEM) is used. For example, FE-SEM S4800 manufactured by Hitachi, Ltd. can be used, and this FE-SEM was used in Examples described below. The cross-sectional image is acquired as a secondary electron (SE) image. The cross-sectional sample can be produced by focused ion beam (FIB) processing. In the cross-sectional image obtained at each of the above-described seven locations, a portion of the magnetic layer is traced by a digitizer, and an area of the traced portion is divided by the length of the cross-sectional sample, thereby calculating the thickness of the magnetic layer at each of the seven locations. An arithmetic average of the calculated values is defined as a thickness of the magnetic layer of the magnetic recording medium to be measured. The interface between the magnetic layer and the adjacent portion (for example, non-magnetic) layer can be specified by the following method. The cross-sectional image is digitized to create image brightness data in the thickness direction (consisting of three components of coordinates in the thickness direction, coordinates in the width direction, and brightness). In the digitization, the cross-sectional image is divided into 1280 pieces in the width direction and processed with 8 bits of brightness to obtain data of 256 gradations, and the image brightness of each divided coordinate point is converted into a predetermined gradation value. Next, in the obtained image brightness data, a brightness curve is created with an arithmetic average of the brightness in the width direction at each coordinate point in the thickness direction (that is, an arithmetic average of the brightness at each coordinate point divided by 1280 pieces) on a vertical axis and the coordinates in the thickness direction on a horizontal axis. A differential curve is created by differentiating the created brightness curve, and the coordinates of the boundary between the magnetic layer and the non-magnetic layer are specified from a peak position of the created differential curve. A position corresponding to the specified coordinates on the cross-sectional image is defined as an interface between the magnetic layer and the non-magnetic layer.

Residual magnetization σr of the ferromagnetic powder, which will be described below, can be obtained by the following method. The measurement is performed by the same method as described above by attaching capsule containing a ferromagnetic powder to be measured to a sample rod of a vibrating sample magnetometer and applying an external magnetic field thereto in any direction, thereby obtaining a residual magnetization amount (unit: emu). Regarding the unit, 1 emu=$1\times10^{-3}$ $A\cdot m^2$. The amount of the ferromagnetic powder contained in the capsule may be, for example, 10 mg or more (for example, about 100 mg). The capsule may be filled with only the ferromagnetic powder, and in a case where the amount of the ferromagnetic powder is smaller than the amount filling the capsule, a space in the capsule may be filled with a non-magnetic material to fix the ferromagnetic powder. The residual magnetization σr (unit: emu/g) of the ferromagnetic powder is obtained as a value obtained by dividing the obtained residual magnetization amount by the mass (unit: g) of the ferromagnetic powder contained in the capsule.

As a result of intensive studies to provide a magnetic recording medium capable of exhibiting excellent electromagnetic conversion characteristics in a small bit size region, the present inventor has newly found that, in a small bit size region in which the reproduction bit size is 40,000 $nm^2$ or less, a magnetic recording medium exhibiting a residual magnetic flux density $Br_{vertical}$ in the vertical direction of a specific value or more in relation to the reproduction bit size S can exhibit excellent electromagnetic conversion characteristics. Specifically, it has been clarified that, in a case where a numerical value of the residual magnetic flux density $Br_{vertical}$ which is expressed in the unit G, in the vertical direction of the magnetic recording medium is equal to or more than X calculated as $X=-0.01S+1550$, excellent electromagnetic conversion characteristics can be obtained in a small bit size region in which the reproduction bit size is 40,000 $nm^2$ or less.

Hereinafter, the magnetic recording medium and the magnetic recording and reproducing device will be further described in detail.

<Reproduction Bit Size S>

The reproduction bit size S is 40,000 $nm^2$ or less. From the viewpoint of increasing the capacity, it is preferable that the reproduction bit size S is small, and, from this point, the reproduction bit size S is preferably 38,000 $nm^2$ or less, more preferably 35,000 $nm^2$ or less, still more preferably 30,000 $nm^2$ or less, and still more preferably 25,000 $nm^2$ or less. In addition, the reproduction bit size S may be, for example, 8,000 $nm^2$ or more or 10,000 $nm^2$ or more, and may be less than the values exemplified here from the viewpoint of further increasing the capacity.

<$Br_{vertical}$>

$Br_{vertical}$ of the magnetic recording medium is obtained by the method described above, and the unit thereof is G. For example, in a case where the obtained $Br_{vertical}$ is b Gauss (G), the numerical value to be contrasted with X is "b". X is calculated as $X=-0.01S+1550$, and is a unitless value. In the magnetic recording medium and the magnetic recording and reproducing device, and the numerical value of the residual magnetic flux density $Br_{vertical}$, which is expressed in the unit G, in the vertical direction of the magnetic recording medium is X or more. As described above, in a case where $Br_{vertical}$ is X or more with respect to X determined from the reproduction bit size S, excellent electromagnetic conversion characteristics can be obtained in a small bit size region in which the reproduction bit size is 40,000 $nm^2$ or less. $Br_{vertical}$ is X Gauss (G) or more, preferably 1200 G or more, more preferably 1250 G or more, still more preferably 1300 G or more, and still more preferably 1400 G or more. $Br_{vertical}$ may be, for example, 3,000 G or less, 2,500 G or less, or 2,000 G or less. Since high $Br_{vertical}$ is preferred from the viewpoint of further improving the electromagnetic conversion characteristics in the small bit size region, $Br_{vertical}$ can exceed the values exemplified here.

It has been found through the study by the present inventor that, with respect to $Br_{vertical}$, $Br_{vertical}$ tends to be increased by the following means. Therefore, by combining one or two or more of these means, a magnetic recording medium having $Br_{vertical}$ of X Gauss (G) or more can be produced.

(1) A ferromagnetic powder having high saturation magnetization σr is used as the ferromagnetic powder.
(2) The physical alignment of the ferromagnetic powder in the magnetic layer is improved.
(3) During preparation of a magnetic layer forming composition for forming the magnetic layer for forming the magnetic layer, chipping of particles of the ferromagnetic powder is suppressed.
(4) The filling ratio of the ferromagnetic powder in the magnetic layer is increased.

<Magnetic Layer>

(Ferromagnetic Powder)

For the ferromagnetic powder contained in the magnetic layer of the magnetic recording medium, it is preferable to use a ferromagnetic powder having a small average particle size as the ferromagnetic powder, from the viewpoint of improving the recording density. From this point, the average particle size of the ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from the viewpoint of the magnetization stability, the average particle size of the ferromagnetic powder is preferably 5 nm or more, more preferably 8 nm or more, still more preferably 10 nm or more, still more preferably 15 nm or more, and still more preferably 20 nm or more.

In the present invention and the present specification, unless otherwise noted, an average particle size of various powders such as ferromagnetic powders is a value measured by the following method using a transmission electron microscope.

The powder is imaged at an imaging magnification of 100,000× with a transmission electron microscope, and the image is printed on photographic printing paper or displayed on a display so that the total magnification is 500,000×, to obtain an image of particles configuring the powder. A target particle is selected from the obtained image of particles, an outline of the particle is traced by a digitizer, and a size of the particle (primary particle) is measured. The primary particles are independent particles without aggregation.

The measurement described above is performed regarding 500 particles randomly extracted. An arithmetic average of the particle sizes of 500 particles thus obtained is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described below is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and the present specification, the powder means aggregation of a plurality of particles. For example, ferromagnetic powder means aggregation of a plurality of ferromagnetic particles. Further, the aggregation of the plurality of particles not only includes an aspect in which particles constituting the aggregate directly come into contact with each other, but also includes an aspect in which a binding agent or an additive which will be described below is interposed between the particles. The term "particle" is used to describe a powder in some cases.

As a method of collecting sample powder from the magnetic recording medium in order to measure the particle size, a method disclosed in a paragraph 0015 of JP2011-048878A can be adopted, for example.

In the present invention and the present specification, unless otherwise noted, (1) in a case where the shape of the particle observed in the particle photograph described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter refers to a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

The magnetic recording medium may contain one or more kinds of ferromagnetic powders in the magnetic layer. Specific examples of the ferromagnetic powder include a hexagonal ferrite powder and an ε-iron oxide powder.

For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and the present specification, the term "hexagonal ferrite powder" refers to a ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom, and an oxygen atom, as a constituent atom. The divalent metal atom is a metal atom that can be a divalent cation as an ion, and examples thereof may include an alkaline earth metal atom such as a strontium atom, a barium atom, and a calcium atom, and a lead atom. In the present invention and the present specification, a hexagonal strontium ferrite powder refers to a powder in which a main divalent metal atom is a strontium atom, and a hexagonal barium ferrite powder refers to a powder in which a main divalent metal atom is a barium atom. The main divalent metal atom refers to a divalent metal atom that accounts for the most on atom % basis in the divalent metal atom included in the powder. Note that a rare earth atom is not included in the above divalent metal atom. The "rare earth atom" in the present invention and the present specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom I, an ytterbium atom (Yb), and a lutetium atom (Lu).

As the hexagonal ferrite crystal structure, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal ferrite powder, a single crystal structure or two or more crystal structures may be detected by X-ray diffraction analysis. For example, according to one aspect, in the hexagonal ferrite powder, only the M-type crystal structure may be detected by X-ray diffraction analysis. For example, M-type hexagonal ferrite is represented by a composition formula of $AFe_{12}O_{19}$. Here, A represents a divalent metal atom. In a case where the hexagonal strontium ferrite powder is M type, A is only a strontium atom (Sr), or in a case where, as A, a plurality of divalent metal atoms are included, as described above, a strontium atom (Sr) accounts for the most on atom % basis. In a case where the hexagonal barium ferrite powder is M type, A is only a barium atom (Ba), or in a case where, as A, a plurality of divalent metal atoms are included, as described above, a barium atom (Ba) accounts for the most on atom % basis. The divalent metal atom content of the hexagonal ferrite powder is usually determined by the type of crystal structure of the hexagonal ferrite and is not particularly limited. The same applies to the iron atom content and the oxygen atom content. The hexagonal ferrite powder may contain at least an iron atom, a divalent metal atom, and an oxygen atom, and may further include a rare earth atom. In addition, the hexagonal ferrite powder may contain an atom other than the above-mentioned atoms, for example, one or more kinds of an aluminum atom (Al), a cobalt atom (Co), a titanium atom (Ti), a niobium atom (Nb), a bismuth atom (Bi), and the like.

In the present invention and the present specification, the term "F-iron oxide powder" refers to a ferromagnetic powder in which an F-iron oxide type crystal structure is detected as a main phase by X-ray diffraction analysis. For example, in a case where the highest intensity diffraction peak is attributed to an F-iron oxide type crystal structure in an X-ray diffraction spectrum obtained by X-ray diffraction analysis, it is determined that the F-iron oxide type crystal structure is detected as the main phase. As a method of manufacturing an F-iron oxide powder, a producing method from a goethite, a reverse micelle method, and the like are known. All of the manufacturing methods are well known. Regarding a method of manufacturing an F-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Note that the manufacturing method of the F-iron oxide powder capable of being used as the ferromagnetic powder in the magnetic layer of the magnetic recording medium is not limited to the methods described here.

High residual magnetization σr of the ferromagnetic powder contained in the magnetic layer can contribute to increasing $Br_{vertical}$ of the magnetic recording medium. From this point, the residual magnetization σr of the ferromagnetic powder is preferably 20.0 emu/g or more, more preferably 20.5 emu/g or more, still more preferably 21.0 emu/g or more, still more preferably 21.5 emu/g or more, and still more preferably 22.0 emu/g or more. The residual magnetization σr of the ferromagnetic powder may be, for example, 50.0 emu/g or less, 45.0 emu/g or less, or 40.0 emu/g or less, and may exceed the values exemplified here.

The residual magnetization σr of the ferromagnetic powder can be controlled by the composition and/or the production method of the ferromagnetic powder. For example, for the hexagonal ferrite powder, the residual magnetization σr can be adjusted depending on the type and content of metal atoms other than the iron atom and the divalent metal atom. In a case where the hexagonal ferrite powder is produced by, for example, a glass crystallization method, a hexagonal ferrite powder having high residual magnetization σr is likely to be obtained in a case where a crystallization temperature in a crystallization step is increased.

The content (filling ratio) of the ferromagnetic powder of the magnetic layer is preferably in a range of 30 to 90 vol %, more preferably in a range of 40 to 90 vol %, and still more preferably in a range of 50 to 90 vol %, on a volume basis. Increasing the filling ratio of the ferromagnetic powder in the magnetic layer can contribute to increasing $Br_{vertical}$ of the magnetic recording medium. For example, by increasing a proportion of the ferromagnetic powder in a solid content (that is, components excluding a solvent) of the magnetic layer forming composition, a magnetic layer having a high filling ratio of the ferromagnetic powder can be formed.

(Binding Agent)

The magnetic recording medium can be a coating type magnetic recording medium, and can include a binding agent in the magnetic layer. The binding agent is one or more resins. As the binding agent, various resins usually used as a binding agent of a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins may be homopolymers or copolymers. These resins can be used as the binding agent even in a non-magnetic layer and/or a back coating layer which will be described below.

For the binding agent described above, descriptions disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the present invention and the present specification is a value obtained by performing polystyrene conversion of a value measured by gel permeation chromatography (GPC) under the following measurement conditions. The weight-average molecular weight of the binding agent shown in Examples described below is a value obtained by performing polystyrene conversion of a value measured under the following measurement conditions. The binding agent may be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

(Curing Agent)

A curing agent can also be used together with the resin which can be used as the binding agent. As the curing agent, in one aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. At least a part of the curing agent is contained in the magnetic layer in a state of being reacted (crosslinked) with other components such as the binding agent, by proceeding the curing reaction in the magnetic layer forming step. The same applies to the layer formed using this composition in a case where the composition used to form the other layer includes a curing agent. The preferred curing agent is a thermosetting compound, polyisocyanate is suitable. For details of the polyisocyanate, descriptions disclosed in paragraphs 0124 and 0125 of JP2011-216149A can be referred to. The curing agent can be used in the magnetic layer forming composition in an amount of, for example, 0 to 80.0 parts by mass, and preferably 50.0 to 80.0 parts by mass from the viewpoint of improving a strength of the magnetic layer, with respect to 100.0 parts by mass of the binding agent.

(Additive)

The magnetic layer may include one or more kinds of additives, as necessary. As the additives, the curing agent described above is used as an example. In addition, examples of the additive which can be contained in the magnetic layer include a non-magnetic powder (for example, an inorganic powder or carbon black), a lubricant, a dispersing agent, a dispersing assistant, an antibacterial agent, an antistatic agent, an antioxidant, and the like. For example, for the lubricant, descriptions disclosed in paragraphs 0030 to 0033, 0035, and 0036 of JP2016-126817A can be referred to. The non-magnetic layer described below may include a lubricant. For the lubricant which may be included in the non-magnetic layer, descriptions disclosed in paragraphs 0030, 0031, and 0034 to 0036 of JP2016-126817A can be referred to. For the dispersing agent, descriptions disclosed in paragraphs 0061 and 0071 of JP2012-133837A can be referred to. In addition, a polymer that can function as a dispersing agent such as an amine-based polymer can also be used. The dispersing agent may be added to a non-magnetic layer forming composition. For the dispersing agent that can be added to the non-magnetic layer forming composition, a description disclosed in a paragraph 0061 of JP2012-133837A can be referred to. As the non-magnetic powder that can be contained in the magnetic layer, a non-magnetic powder which can function as an abrasive, or a non-magnetic powder which can function as a protrusion forming agent which forms protrusions appropriately protruded from the magnetic layer surface (for example, non-magnetic colloidal particles) is used. An average particle size of colloidal silica (silica colloidal particles) shown in Examples described below is a value obtained by a method disclosed as a measurement method of an average particle diameter in a paragraph 0015 of JP2011-048878A. As the additive, a commercially available product can be suitably selected or manufactured by a well-known method according to the desired properties, and any amount thereof can be used. As an example of the additive which can be used for improving dispersibility of the abrasive in the magnetic layer including the abrasive, a dispersing agent disclosed in paragraphs 0012 to 0022 of JP2013-131285A can be used. Such a dispersing agent can also function as a dispersing agent for improving the dispersibility of the ferromagnetic powder.

The magnetic layer described above can be provided on a surface of the non-magnetic support directly or indirectly through the non-magnetic layer.

<Non-Magnetic Layer>

Next, the non-magnetic layer will be described. The above magnetic recording medium may have a magnetic layer directly on the surface of the non-magnetic support, or may have a magnetic layer on the surface of the non-magnetic support via a non-magnetic layer including non-magnetic powder. The non-magnetic powder used for the non-magnetic layer may be an inorganic substance powder or an organic substance powder. In addition, carbon black and the like can be used. Examples of the inorganic substance powder include powders of metal, metal oxide, metal carbonate, metal sulfate, metal nitride, metal carbide, and metal sulfide. These non-magnetic powders can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling ratio) of the non-magnetic powder of the non-magnetic layer is preferably 50 to 90 mass % and more preferably 60 to 90 mass %.

The non-magnetic layer can include a binding agent, and can also include an additive. For other details of the binding agent or the additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

The non-magnetic layer of the present invention and the present specification also includes a substantially non-magnetic layer containing a small amount of ferromagnetic powder as impurities or intentionally, together with the non-magnetic powder. Here, the substantially non-magnetic layer is a layer having a residual magnetic flux density equal to or smaller than 10 mT, a layer having a coercivity equal to or smaller than 7.96 kA/m (100 Oe), or a layer having a residual magnetic flux density equal to or smaller than 10 mT and a coercivity equal to or smaller than 7.96 kA/m (100 Oe). It is preferable that the non-magnetic layer does not have a residual magnetic flux density and a coercivity.

<Back Coating Layer>

The magnetic recording medium may or may not include a back coating layer including a non-magnetic powder on a surface side of the non-magnetic support opposite to a surface side on which the magnetic layer is provided. The back coating layer preferably contains any one or both of carbon black and an inorganic powder. The back coating layer can include a binding agent and can also include additives. In regards to the binding agent and the additive of the back coating layer, a well-known technology regarding the back coating layer can be applied, and a well-known technology regarding the formulation of components of the magnetic layer and/or the non-magnetic layer can be applied. For example, for the back coating layer, descriptions disclosed in paragraphs 0018 to 0020 of JP2006-331625A and column 4, line 65 to column 5, line 38 of U.S. Pat. No. 7,029,774B can be referred to.

<Non-Magnetic Support>

Next, the non-magnetic support will be described. Examples of the non-magnetic support (hereinafter, simply referred to as a "support") include well-known components such as polyethylene terephthalate, polyethylene naphthalate, polyamide, and polyamideimide subjected to biaxial stretching. Among these, polyethylene terephthalate, polyethylene naphthalate, and polyamide (for example, aromatic polyamide) are preferable. A corona discharge, a plasma treatment, an easy-bonding treatment, or a heat treatment may be performed on these supports in advance.

<Various Thicknesses>

A thickness of the non-magnetic support is preferably 3.00 to 5.00 m.

The thickness of the magnetic layer can be optimized depending on a saturation magnetization amount of the magnetic head to be used, a head gap length, a band of a recorded signal, and the like, and is preferably 50.0 nm or less and more preferably in a range of 10.0 to 50.0 nm from the viewpoint of further increasing $Br_{vertical}$. The magnetic layer need only be at least a single layer, the magnetic layer may be separated into two or more layers having different magnetic properties, and a configuration of a well-known multilayered magnetic layer can be applied as the magnetic layer. The thickness of the magnetic layer in a case where the magnetic layer is separated into two or more layers is a total thickness of the layers.

A thickness of the non-magnetic layer is, for example, 0.10 to 1.50 m, and preferably 0.10 to 1.00 m.

A thickness of the back coating layer is preferably 0.90 m or less, and more preferably 0.10 to 0.70 m.

A method of measuring the thickness of the magnetic layer is as described above. The thicknesses of other layers and the thickness of the non-magnetic support can also be obtained in the same manner as or in accordance with the method described above. Alternatively, the various thicknesses can be obtained as a designed thickness calculated according to manufacturing conditions.

<Manufacturing Step>

(Preparation of Each Layer Forming Composition)

A step of preparing a composition for forming the magnetic layer, the non-magnetic layer, or the back coating layer can usually include at least a kneading step, a dispersing step, and, as necessary, a mixing step provided before and after these steps. Each step may be divided into two or more stages. Components used for the preparation of each layer forming composition may be added at an initial stage or in a middle stage of each step. As a solvent, one or more kinds of various solvents usually used for manufacturing a coating type magnetic recording medium can be used. For the solvent, for example, a description disclosed in a paragraph 0153 of JP2011-216149A can be referred to. In addition, each component may be separately added in two or more steps. For example, a binding agent may be added separately in a kneading step, a dispersing step, and a mixing step for adjusting a viscosity after dispersion. In order to manufacture the above magnetic recording medium, a well-known manufacturing technology can be used in various steps. In the kneading step, an open kneader, a continuous kneader, a pressure kneader, or a kneader having a strong kneading force such as an extruder is preferably used. For details of the kneading treatment, descriptions disclosed in JP1989-106338A (JP-H01-106338A) and JP1989-79274A (JP-H01-79274A) can be referred to. As a dispersing device, a well-known dispersing device can be used. In any stage of preparing each layer forming composition, filtering may be performed by a well-known method. The filtering can be performed by using a filter, for example. As the filter used in the filtering, a filter having a pore diameter of 0.01 to 3 m (for example, filter made of glass fiber or filter made of polypropylene) can be used, for example.

In a step of preparing the magnetic layer forming composition, it is preferable to prepare a magnetic liquid containing a ferromagnetic powder, a binding agent, and a solvent, and an abrasive solution containing an abrasive and a solvent in separate steps. By mixing the ferromagnetic powder and the abrasive after preparing them in separate steps, the dispersibility of the ferromagnetic powder in the magnetic layer forming composition can be improved. It is preferable that a step of preparing the magnetic liquid includes one or more kinds of dispersion treatments. High dispersibility of the ferromagnetic powder in the magnetic layer is preferred from the viewpoint of improving the physical alignment of the ferromagnetic powder in the magnetic layer by a vertical alignment treatment. For that purpose, it is preferable to increase the dispersibility of the ferromagnetic powder in the magnetic liquid by a dispersion treatment. From the viewpoint of improving the dispersibility, it is preferable to perform a dispersion treatment using a dispersion medium as the dispersion treatment of the magnetic liquid. The dispersion treatment using a dispersion medium is effective for improving the dispersibility of the ferromagnetic powder in the magnetic liquid because a force for breaking aggregation between particles of the ferromagnetic powder is usually stronger than that in a dispersion treatment not using a dispersion medium (for example, ultrasonic dispersion). Note that chipping of the particles of the ferromagnetic powder by the dispersion treatment can lower $Br_{vertical}$ of the magnetic recording medium. Therefore, it is preferable that the dispersion treatment of the magnetic liquid is performed such that the dispersibility of the ferromagnetic powder can be improved while suppressing the chipping of the particles of the ferromagnetic powder. From the above point, a preferable dispersion treatment is bead dispersion. As preferable dispersion treatment conditions for bead dispersion, a condition that E calculated by Equation 1 is 10,000 nJ or less and W calculated by Equation 2 is 1.0 J·min. (J·minute) or more 30.0 J·min. or less can be mentioned.

$$E=(a\times v^2\times 10^6)/2 \quad \text{Equation 1}$$

$$W=E\times 10^{-9}\times b\times t \quad \text{Equation 2}$$

In Equation 1, the unit of E is nJ (nanojoule), a represents a total mass of beads used for bead dispersion (unit: g), and v represents a movement velocity of the beads during bead dispersion (unit: μm/sec). As the movement velocity v of the beads, for example, a value of a linear velocity at the outermost periphery of a rotor, which is calculated from a rotor radius of the dispersing device and a rotor rotation speed set in the dispersing device, can be applied.

In Equation 2, E is obtained by Equation 1. The unit of W is J·min., and b represents the number of beads used per 1 $cm^3$ of the magnetic liquid in the bead dispersion and is also described below as a bead number density (unit: pieces/$cm^3$). t represents a dispersion time (unit: min.) of the bead dispersion.

It is preferable that E calculated by Equation 1 is 10,000 nJ or less, from the viewpoint of suppressing the occurrence of the chipping of the particles of the ferromagnetic powder. E described above is more preferably 7,000 nJ or less, still more preferably 5,000 nJ or less, still more preferably 3,000 nJ or less, still more preferably 2,000 nJ or less, still more preferably 1,000 nJ or less, still more preferably 500 nJ or less, and still more preferably 100 nJ or less. In addition, E described above may be, for example, 20 nJ or more or 30 nJ or more. Note that the value may be less than the values exemplified here.

On the other hand, it is preferable that W calculated by Equation 2 is 30.0 J·min. or less, from the viewpoint of suppressing the occurrence of the chipping of the particles of the ferromagnetic powder. W described above is preferably 20.0 J·min. or less, more preferably 15.0 J·min. or less, and still more preferably 10.0 J·min. or less. In addition, W described above is preferably 1.0 J·min. or more to improve the dispersibility of the ferromagnetic hexagonal ferrite powder in the magnetic liquid. From this point, W described above is more preferably 2.0 J·min. or more.

Regarding dispersion beads used for the bead dispersion of the magnetic liquid, a density of the dispersion beads is preferably more than 3.7 g/$cm^3$ and more preferably 3.8 g/$cm^3$ or more. In addition, the density of the dispersion beads may be, for example, 7.0 g/$cm^3$ or less, or may be more than 7.0 g/$cm^3$. Here, the density is obtained by dividing the mass (unit: g) of the dispersion beads by the volume (unit: $cm^3$) of the dispersion beads. The measurement is performed by an Archimedes method. As the dispersion beads, it is preferable to use zirconia, alumina, or stainless steel beads alone, or to use a mixture of two or more kinds thereof. The dispersion beads used for the bead dispersion of the magnetic liquid preferably have a bead diameter in a range of 0.01 to 0.50 mm. The bead diameter is a value measured for the dispersion beads used in the dispersion treatment by the same method as the above-described method of measuring the average particle size of the powder. The filling ratio of the dispersion beads in the dispersing device may be, for example, 30 to 80 vol %, and preferably 50 to 80 vol %, on a volume basis. The dispersion time (retention time in the dispersing device) is preferably 10 to 180 minutes, and more preferably 10 to 120 minutes.

(Coating Step)

The magnetic layer can be formed by directly applying the magnetic layer forming composition onto the non-magnetic support surface or performing multilayer coating of the magnetic layer forming composition with the non-magnetic layer forming composition in order or at the same time. The back coating layer can be formed by applying a back coating layer forming composition onto a surface of the non-magnetic support opposite to a surface having the non-magnetic layer and/or the magnetic layer (or to be provided with the non-magnetic layer and/or the magnetic layer). For details of the coating for forming each layer, a description disclosed in a paragraph 0066 of JP2010-231843A can be referred to.

(Other Steps)

After the coating step, various treatments such as a drying treatment, an alignment treatment of the magnetic layer, and a surface smoothing treatme19alendaringring treatment) can be performed. For various treatments, for example, a well-known technology disclosed in paragraphs 0052 to 0057 of JP2010-24113A can be referred to. For example, the coating layer of the magnetic layer forming composition can be subjected to an alignment treatment, while the coating layer is wet. For the alignment treatment, various well-known technologies including a description disclosed in a paragraph 0067 of JP2010-231843A can be used. For example, a vertical alignment treatment can be performed by a well-known method such as a method using a polar opposing magnet. In an alignment zone, a drying speed of the coating layer can be controlled depending on a temperature, an air volume of drying air and/or a transportation speed of the non-magnetic support on which the coating layer is formed in the alignment zone. In addition, the coating layer may be preliminarily dried before the transportation to the alignment zone. The vertical alignment treatment leads to improving the physical alignment of the ferromagnetic powder in the magnetic layer, which can contribute to increasing $Br_{vertical}$ of the magnetic recording medium. Increasing the alignment magnetic field intensity in the vertical alignment treatment can lead to further increasing $Br_{vertical}$ of the magnetic recording medium. The alignment magnetic field intensity may be, for example, in a range of 0.1 to 1.5 T (tesla).

The magnetic recording medium may be a tape-shaped magnetic recording medium (magnetic tape) or a disk-shaped magnetic recording medium (magnetic disk). For example, the magnetic tape is usually accommodated in a magnetic tape cartridge and the magnetic tape cartridge is mounted on a magnetic recording and reproducing device. A servo pattern can also be formed on the magnetic recording medium by a well-known method in order to enable head tracking in the magnetic recording and reproducing device. The term "formation of servo pattern" can also be referred to as "recording of servo signal". Hereinafter, the formation of the servo patterns will be described using a magnetic tape as an example.

The servo pattern is usually formed along the longitudinal direction of the magnetic tape. Examples of control (servo control) systems using a servo signal include a timing based servo (TBS), an amplitude servo, and a frequency servo.

As shown in European Computer Manufacturers Association (ECMA)-319 (June 2001), a timing-based servo system is adopted in a magnetic tape based on a linear tape-open (LTO) standard (generally referred to as an "LTO tape"). In this timing-based servo system, the servo pattern is formed by continuously disposing a plurality of pairs of non-parallel magnetic stripes (also referred to as "servo stripes") in the longitudinal direction of the magnetic tape. The servo system is a system that performs head tracking using servo signals. In the present invention and the present specification, the term "timing-based servo pattern" refers to a servo pattern that enables head tracking in a timing-based servo system. As described above, the reason why the servo pattern is formed of a pair of non-parallel magnetic stripes is to indicate, to a servo signal reading element passing over the servo pattern, a passing position thereof. Specifically, the pair of magnetic stripes is formed such that an interval thereof continuously changes along a width direction of the magnetic tape, and the servo signal reading element reads the interval to thereby sense a relative position between the servo pattern and the servo signal reading element. Information on this relative position enables tracking on a data track. Accordingly, a plurality of servo tracks are usually set on the servo pattern along the width direction of the magnetic tape.

A servo band is formed of a servo pattern continuous in the longitudinal direction of the magnetic tape. A plurality of the servo bands are usually provided on the magnetic tape. For example, in an LTO tape, the number of the servo bands is five. Regions interposed between two adjacent servo bands are data bands. The data band is formed of a plurality of data tracks and each data track corresponds to each servo track.

Further, in one aspect, as shown in JP2004-318983A, information indicating a servo band number (referred to as "servo band identification (ID)" or "unique data band identification method (UDIM) information") is embedded in each servo band. This servo band ID is recorded by shifting a specific one of the plurality of pairs of the servo stripes in the servo band so that positions thereof are relatively displaced in the longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

As a method for uniquely specifying the servo band, there is a method using a staggered method as shown in ECMA-319 (June 2001). In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319 (June 2001), information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Note that, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding the information in the servo band, a method other than the method described above can be used. For example, a predetermined code may be recorded by thinning out a predetermined pair from the group of pairs of servo stripes.

A head for forming a servo pattern is called a servo write head. The servo write head usually has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 μm or less, 1 to 10 μm, 10 μm or more, and the like.

Before the servo pattern is formed on the magnetic tape, the magnetic tape is usually subjected to a demagnetization (erasing) treatment. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while reversing a direction of the magnetic field applied to the magnetic tape. Meanwhile, the DC erasing is performed by applying a unidirectional magnetic field to the magnetic tape. The DC erasing further includes two methods. A first method is horizontal DC erasing of applying a unidirectional magnetic field along a longitudinal direction of the magnetic tape. A second method is vertical DC erasing of applying a unidirectional magnetic field along a thickness direction of the magnetic tape. The erasing treatment may be performed on the entire magnetic tape or may be performed for each servo band of the magnetic tape.

A direction of the magnetic field of the servo pattern to be formed is determined according to a direction of the erasing. For example, in a case where the horizontal DC erasing is performed to the magnetic tape, the servo pattern is formed so that the direction of the magnetic field is opposite to the direction of the erasing. Therefore, an output of a servo signal obtained by reading the servo pattern can be increased. As disclosed in JP2012-53940A, in a case where a magnetic pattern is transferred to, using the gap, a magnetic tape that has been subjected to vertical DC erasing, a servo signal obtained by reading the formed servo pattern has a monopolar pulse shape. Meanwhile, in a case where a magnetic pattern is transferred to, using the gap, a magnetic tape that has been subjected to horizontal DC erasing, a servo signal obtained by reading the formed servo pattern has a bipolar pulse shape.

<Magnetic Recording and Reproducing Device>

In the present invention and the present specification, the term "magnetic recording and reproducing device" means a device capable of performing at least one of the recording of data on the magnetic recording medium or the reproducing of data recorded on the magnetic recording medium. Such a device is generally called a drive. The magnetic recording and reproducing device can be, for example, a sliding type magnetic recording and reproducing device. The sliding type magnetic recording and reproducing device is a device in which the surface on the magnetic layer side and the magnetic head come into contact with each other to be slid on each other, in a case of performing recording of data on the magnetic recording medium and/or reproducing of the recorded data. For example, the magnetic recording and reproducing device can attachably and detachably include the magnetic tape cartridge.

The magnetic recording and reproducing device may include a magnetic head. The magnetic head can be a recording head capable of performing the recording of data on the magnetic tape, or can be a reproducing head capable of performing the reproducing of data recorded on the magnetic tape. In addition, in one aspect, the magnetic recording and reproducing device can include both a recording head and a reproducing head as separate magnetic heads. In another aspect, the magnetic head included in the magnetic recording and reproducing device can have a configuration in which both an element for recording data (recording element) and an element for reproducing data (reproducing element) are included in one magnetic head. Hereinafter, the element for recording data and the element for reproducing are collectively referred to as "elements for data". As the reproducing head, a magnetic head (MR head) including a magnetoresistive (MR) element capable of sensitively reading data recorded on the magnetic tape as a reproducing element is preferable. As the MR head, various well-known MR heads such as an Anisotropic Magnetoresistive (AMR) head, a Giant Magnetoresistive (GMR) head, or a Tunnel Magnetoresistive (TMR) can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing device. For example, a magnetic head that records data and/or reproduces recorded data (hereinafter also referred to as "recording and reproducing head") can include two servo signal reading elements, and the two servo signal reading elements can simultaneously read two adjacent servo bands. One or a plurality of elements for data can be disposed between the two servo signal reading elements.

In the magnetic recording and reproducing device, recording of data on the magnetic recording medium and/or reproducing of data recorded on the magnetic recording medium can be performed, for example, as the surface of the magnetic recording medium on the magnetic layer side and the magnetic head come into contact with each other to be slid on each other. The magnetic recording and reproducing device has the reproduction bit size S of 40,000 $nm^2$ or less and need only include the magnetic recording medium according to one aspect of the present invention, and a well-known technology can be applied to the others.

For example, in a case of recording data and/or reproducing recorded data, first, tracking using the servo signal is performed. That is, by causing the servo signal reading element to follow a predetermined servo track, the element for data is controlled to pass on the target data track. Displacement of the data track is performed by changing a servo track read by the servo signal reading element in a tape width direction.

The recording and reproducing head can also perform recording and/or reproduction with respect to other data bands. In this case, the servo signal reading element need only be displaced to a predetermined servo band using the above described UDIM information to start tracking for the servo band.

[Magnetic Tape Cartridge]

Another aspect of the present invention relates to a magnetic tape cartridge including the aforementioned tape-shaped magnetic recording medium (that is, the magnetic tape).

Details of the magnetic tape included in the magnetic tape cartridge are as described above.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing device for recording and/or reproducing data on the magnetic tape, the magnetic tape is pulled out of the magnetic tape cartridge to be wound around the reel on the magnetic recording and reproducing device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing device side. During this time, for example, data is recorded and/or reproduced as the magnetic head and the surface of the magnetic tape on the magnetic layer side come into contact with each other to be slid on each other. With respect to this, in the dual reel type magnetic tape cartridge, both reels of the supply reel and the winding reel are provided in the magnetic tape cartridge. The magnetic tape cartridge may be any of single reel type magnetic tape cartridge and dual reel type magnetic tape cartridge. The above magnetic tape cartridge need only include the magnetic recording medium (magnetic tape) according to one aspect of the present invention, and a well-known technology can be applied to the others. The total length of the magnetic tape accommodated in the magnetic tape cartridge may be, for example, 800 m or more, and may be in a range of about 800 m to 2,000 m. It is preferable that the total length of the tape accommodated in the magnetic tape cartridge is long from the viewpoint of increasing the capacity of the magnetic tape cartridge.

EXAMPLES

Hereinafter, the present invention will be described based on Examples. Note that the present invention is not limited to the embodiments shown in Examples. "Parts" and "%" in the following description mean "parts by mass" and "mass %", unless otherwise noted. The following steps and evaluation were performed in an atmosphere of 23° C.±1° C., unless otherwise noted. "eq" in the following description is an equivalent and is a unit that cannot be converted into an SI unit.

[Ferromagnetic Powders A to F]

<Production of Ferromagnetic Powder>

Raw materials shown in Table 1 were weighed in charging amounts shown in Table 1 and mixed with a mixer, to obtain a raw material mixture.

The obtained raw material mixture was melted in a platinum crucible at a melting temperature of 1,380° C., and a hot water outlet provided at a bottom of the platinum crucible was heated while stirring a melt, and the melt was discharged in a rod shape at about 6 g/sec. Hot water was rolled and quenched by a pair of water-cooling rolls to obtain an amorphous body.

280 g of the obtained amorphous body was charged into an electric furnace, an in-furnace temperature of the electric furnace was raised to the crystallization temperature shown in Table 1, and the temperature was maintained at the same temperature for 5 hours to precipitate (crystallize) particles of the ferromagnetic powder.

Next, a crystallized product containing the precipitated particles was coarsely pulverized in a mortar, and 1000 g of zirconia beads having a bead diameter of 1 mm and 800 ml of acetic acid of 1% concentration were added to the crystallized product in a glass bottle containing the coarsely pulverized material, to be dispersed by a paint shaker for 3 hours. After that, the dispersion liquid was separated from the beads and put into a stainless steel beaker. The dispersion liquid was treated at a liquid temperature of 80° C. for 3 hours, and then precipitated with a centrifuge and washed by repeated decantation, and drying was performed in a dryer having an internal atmosphere temperature of 110° C. for 6 hours, to obtain a ferromagnetic powder.

The fact that the ferromagnetic powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffraction beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Composition confirmation of the ferromagnetic powder obtained above was performed by high-frequency inductively coupled plasma-optical emission spectrometry (ICP-OES), and it was confirmed that the ferromagnetic powders A, B, and D to F were hexagonal barium ferrite powders and that the ferromagnetic powder C was a hexagonal strontium ferrite powder.

<Measurement of Residual Magnetization σr of Ferromagnetic Powder>

After 100 mg of each ferromagnetic powder described above was put into a capsule and a space inside the capsule was filled with paraffin, the capsule was attached to a vibrating sample magnetometer (VSM-5 manufactured by Toei Industry Co., Ltd.), and the residual magnetization σr was obtained by the method described above.

[Production of Magnetic Recording Medium]

<Production of Medium 1>

1. Preparation of Alumina Dispersion (Abrasive Solution)

3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 manufactured by Toyobo Co., Ltd. (amount of a polar group: 80 meq/kg)), and 570.0 parts of a mixed solution of methyl ethyl ketone and cyclohexanone at 1:1 (mass ratio) as a solvent were mixed with respect to 100.0 parts of an alumina powder (HIT-80 manufactured by Sumitomo Chemical Co., Ltd.) having a pregelatinization ratio of about 65% and a Brunauer-Emmett-Teller (BET) specific surface area of 20 $m^2/g$, and dispersed in the presence of zirconia beads by a paint shaker for 5 hours. After the dispersion, the dispersion liquid and the beads were separated by a mesh and an alumina dispersion was obtained.

2. Formulation of Magnetic Layer Forming Composition (Magnetic Liquid a)

Ferromagnetic powder 100.0 parts $SO_3Na$ group-containing vinyl chloride copolymer 11.0 parts Weight-average molecular weight: 70,000, $SO_3Na$ group: 0.2 meq/g $SO_3Na$ group-containing polyurethane resin 3.0 parts Weight-average molecular weight: 70,000, $SO_3Na$ group: 0.2 meq/g Oleic acid 1.5 parts Amine-based polymer (DISPERBYK-102 manufactured by BYK-chemie)

10.0 parts

Cyclohexanone 150.0 parts

Methyl ethyl ketone 170.0 parts (Abrasive Solution)

Alumina dispersion prepared in the section 1 6.0 parts (Silica Sol)

Colloidal silica 2.0 parts

Average particle size: 100 nm (Other Components)

Stearic acid 2.0 parts

Butyl stearate 6.0 parts

Polyisocyanate (CORONATE (registered trademark) manufactured by Tosoh Corporation) 2.5 parts (Finishing Additive Solvent)

Cyclohexanone 300.0 parts

Methyl ethyl ketone 140.0 parts

3. Formulation of Non-Magnetic Layer Forming Composition

Carbon black 100.0 parts

Average particle size: 20 nm $SO_3Na$ group-containing vinyl chloride copolymer 10.0 parts Weight-average molecular weight: 70,000, $SO_3Na$ group: 0.2 meq/g $SO_3Na$ group-containing polyurethane resin 4.0 parts Weight-average molecular weight: 70,000, $SO_3Na$ group: 0.2 meq/g Trioctylamine 5.0 parts Stearic acid 2.0 parts Butyl stearate 2.0 parts Cyclohexanone 450.0 parts Methyl ethyl ketone 450.0 parts 4. Formulation of Back Coating Layer Forming Composition Non-magnetic inorganic powder: α-iron oxide 80.0 parts Average particle size (average long axis length): 0.15 m, average acicular ratio: 7, BET specific surface area: 52 $m^2/g$ Carbon black 20.0 parts Average particle size: 20 nm Vinyl chloride copolymer 13.0 parts Sulfonic acid base-containing polyurethane resin 6.0 parts Phenylphosphonic acid 3.0 parts Cyclohexanone 355.0 parts Methyl ethyl ketone 155.0 parts Stearic acid 3.0 parts Butyl stearate 3.0 parts Polyisocyanate 5.0 parts 5. Preparation of Each Layer Forming Composition The magnetic layer forming composition was prepared by the following method.

The above-described components of the magnetic liquid were mixed using a homogenizer, and then the beads were dispersed using a continuous horizontal beads mill. The processing conditions for the bead dispersion were as follows. The movement velocity v of the beads during the bead dispersion described below is a linear velocity at the outermost periphery of the rotor, which is calculated from the rotor radius of the beads mill and the rotor rotation speed set in the beads mill.

(Bead Dispersion Condition 1)

Dispersion medium: zirconia beads (bead density: 6.0 $g/cm^3$, bead diameter: 0.05 mm)

Total bead mass a: $3.9\times10^{-7}$ g

Movement velocity v of beads during bead dispersion: 15 m/sec

E calculated by Equation 1: 44 nJ

Bead filling rate: 60 vol %

Bead number density b: $6.11\times10^6$ pieces/$cm^3$

Dispersion time t: 10 minutes

W calculated by Equation 2: 2.7 J·min.

The prepared magnetic liquid was mixed with the abrasive solution and other components (silica sol, other components, and finishing additive solvent) by using the beads mill, and then the mixture was subjected to the treatment (ultrasonic dispersion) for 0.5 minutes by a batch type ultrasonic apparatus (20 kHz, 300 W). Thereafter, filtration was performed using a filter having a pore diameter of 0.5 m to prepare a magnetic layer forming composition.

A non-magnetic layer forming composition was prepared by the following method.

The components excluding stearic acid and butyl stearate were dispersed by using a batch type vertical sand mill for 12 hours to obtain a dispersion liquid. As dispersion beads, zirconia beads having a bead diameter of 0.1 mm were used. Thereafter, the remaining components were added to the obtained dispersion liquid, and the mixture was stirred by a disper. The dispersion liquid thus obtained was filtered with a filter having a pre diameter of 0.5 μm and a non-magnetic layer forming composition was prepared.

The back coating layer forming composition was prepared by the following method.

The components excluding stearic acid, butyl stearate, polyisocyanate, and cyclohexanone were kneaded and diluted by an open kneader, and then subjected to a dispersion treatment of 12 passes using a horizontal beads mill and zirconia beads having a bead diameter of 1 mm, by setting a bead filling percentage to 80 volume %, a circumferential speed of a rotor tip to 10 m/sec, and a retention time per pass to 2 minutes. Thereafter, the remaining components were added to the obtained dispersion liquid, and the mixture was stirred by a disper. The dispersion liquid thus obtained was filtered using a filter having a pore diameter of 1 μm to prepare a back coating layer forming composition.

6. Production of Magnetic Tape

The non-magnetic layer forming composition prepared in the section 5 was applied onto a surface of a biaxially stretched aromatic polyamide support having a thickness of 3.60 m and was dried so that the thickness after drying is a thickness of 0.10 m, and thus a non-magnetic layer was formed. The magnetic layer forming composition prepared in the section 5 was applied onto the surface of the formed non-magnetic layer so that the thickness after the drying is about 50 nm, and a coating layer was formed. The coating layer of the magnetic layer forming composition was subjected to a vertical alignment treatment by applying a magnetic field of a magnetic field intensity of 0.4 T in a direction perpendicular to a surface of the coating layer while the coating layer was in a wet state, and then dried. After that, the back coating layer forming composition prepared in the section 5 was applied onto a surface of the support opposite to the surface on which the non-magnetic layer and the magnetic layer are formed and was dried so that the thickness after drying was 0.40 m, and thus, a back coating layer was formed.

After that, a surface smoothing treatme30alendaringring treatment) was performed by using a calender configured of only a metal roll, at a speed of 100 m/min, a linear pressure of 300 kg/cm (294 kN/m), and a surface temperature of a calender roll of 100° C.

After that, a heat treatment was performed for 36 hours in an environment of an ambient temperature of 70° C., and then a slit was made to a width of ½ inches (0.0127 meters) to obtain a magnetic tape. A thickness of each of the above-described layers is a design thickness calculated from the manufacturing conditions.

In a state where the magnetic layer of the magnetic tape was demagnetized, a servo pattern having disposition and a shape according to the linear tape-open (LTO) Ultrium format was formed on the magnetic layer by using a servo write head mounted on a servo writer. In this way, a magnetic tape including a data band, a servo band, and a guide band in the disposition according to the LTO Ultrium format in the magnetic layer and including a servo pattern having the disposition and the shape according to the LTO Ultrium format on the servo band was obtained.

<Production of Media 2 to 8>

A magnetic tape was obtained in the same manner as in Example 1, except that the items shown in Tables 1 and 2 were changed as shown in Tables 1 and 2 and the amount of the application of the magnetic layer forming composition was changed to change the thickness of the magnetic layer to be formed.

In Table 2, the magnetic liquid b is the following magnetic liquid.

(Magnetic Liquid b)

Ferromagnetic powder 100.0 parts $SO_3Na$ group-containing vinyl chloride copolymer 10.0 parts Weight-average molecular weight: 70,000, $SO_3Na$ group: 0.2 meq/g $SO_3Na$ group-containing polyurethane resin 4.0 parts Weight-average molecular weight: 70,000, $SO_3Na$ group: 0.2 meq/g Oleic acid 1.5 parts 2,3-dihydroxynaphthalene 6.0 parts Cyclohexanone 150.0 parts Methyl ethyl ketone 170.0 parts In Table 2, the magnetic liquid c is the following magnetic liquid.

(Magnetic Liquid c)

Ferromagnetic powder 100.0 parts $SO_3Na$ group-containing vinyl chloride copolymer 8.0 parts Weight-average molecular weight: 70,000, $SO_3Na$ group: 0.2 meq/g $SO_3Na$ group-containing polyurethane resin 2.0 parts Weight-average molecular weight: 70,000, $SO_3Na$ group: 0.2 meq/g Oleic acid 1.5 parts Amine-based polymer (DISPERBYK-102 manufactured by BYK-chemie)

7.0 parts

Cyclohexanone 150.0 parts

Methyl ethyl ketone 170.0 parts

In Table 2, the bead dispersion condition 2 is as follows.

(Bead Dispersion Condition 2)

Dispersion medium: zirconia beads (bead density: 6.0 g/cm$^3$, bead diameter: 0.5 mm)

Total bead mass a: $3.9\times10^{-4}$ g

Movement velocity v of beads during bead dispersion: 10 m/sec

E calculated by Equation 1: 19635 nJ

Bead filling rate: 60 vol %

Bead number density b: $6.11\times10^3$ pieces/cm$^3$

Dispersion time t: 10 minutes

W calculated by Equation 2: 1.2 J·min.

In Table 2, the medium described as "Present" in the column of vertical alignment is a medium produced by performing the vertical alignment treatment in the same manner as in Example 1. In Table 2, the medium described as "Absent" in the column of vertical alignment is a medium produced without performing such a vertical alignment treatment.

For each of the media 1 to 8, two media (magnetic tapes) were produced, one was used for the following evaluation of electromagnetic conversion characteristics, and the other was used for the following various measurements.

[Measurement of Residual Magnetic Flux Density $Br_{vertical}$]

A sample piece having a size of 3.6 cm×3.2 cm was cut out from each medium. For this sample piece, the residual magnetization per unit area of the magnetic recording medium in the vertical direction of the magnetic recording medium (vertical residual magnetization) was obtained by the method described above using a vibrating sample magnetometer (VSM-P7 manufactured by Toei Industry Co., Ltd.) (unit: G nm). The residual magnetic flux density $Br_{vertical}$ (unit: G) in the vertical direction of the magnetic recording medium was obtained by dividing the obtained value by the magnetic layer thickness (unit: nm).

A cross-sectional sample for obtaining the thickness of the magnetic layer was produced by the methods described in (i) and (ii) below. The thickness of the magnetic layer was obtained by the method described above using the produced cross-sectional sample, and the value thereof was shown in Table 2. FE-SEM S4800 manufactured by Hitachi, Ltd. was used as field emission-scanning electron microscope (FE-SEM) for SEM observation.

(i) A sample having a size of 10 mm in a width direction and 10 mm in a longitudinal direction of the magnetic tape was cut out using a razor.

A protective film was formed on a magnetic layer surface of the cut sample to obtain a sample with a protective film. The formation of the protective film was performed by the following method.

A platinum (Pt) film (thickness of 30 nm) was formed on the magnetic layer surface of the sample by sputtering. The sputtering of the platinum film was performed under the following conditions.

(Sputtering Condition for Platinum Film)

Target: Pt

Degree of vacuum in chamber of sputtering device: 7 Pa or less

Current value: 15 mA

A carbon film having a thickness of 100 to 150 nm was further formed on the above-manufactured sample with a platinum film. The formation of the carbon film was performed by a chemical vapor deposition (CVD) mechanism using a gallium ion ($Ga^+$) beam provided in a focused ion beam (FIB) device used in the following (ii).

(ii) FIB processing using a gallium ion ($Ga^+$) beam was performed on the sample with a protective film manufactured in the above (i) using a FIB device to expose a cross section of the magnetic tape. An acceleration voltage in FIB processing was 30 kV, and a probe current was 1,300 pA.

The cross-sectional sample whose cross section was exposed in this way was used for SEM observation for obtaining the thickness of the magnetic layer, and the thickness of the magnetic layer was obtained by the method described above.

In addition, for each medium, as a reference value, the residual magnetic flux density (referred to as "$Br_{parallel}$") in the longitudinal direction of the magnetic tape was obtained in the same manner as described above except that the magnetic field application direction is the longitudinal direction of the magnetic tape. The obtained values are shown in Table 2.

Further, as a reference value, Table 2 shows the value of the product Mrt of the residual magnetization Mr and the thickness t of the magnetic layer for each medium. Mrt shown in Table 2 is the vertical residual magnetization obtained above for each medium.

From the comparison between $Br_{vertical}$ shown in Table 2 described below and Mrt and $Br_{parallel}$ as the reference value, it can be confirmed that a magnitude relation of $Br_{vertical}$ between the media does not correspond to a magnitude relation of Mrt and a magnitude relation of $Br_{parallel}$ between the media.

[Evaluation of Reproduction Output]

Using a ½ inches (0.0127 m) reel tester with a fixed magnetic head, and a reproduction output was obtained by the following method in combination with the recording and reproducing conditions shown in Table 3 and the media. In Table 3, in the combination of the recording and reproducing conditions and the media, the combination in which the numerical value of $Br_{vertical}$ is smaller than X calculated from the reproduction bit size S was described as "$Br_{vertical}<X$".

A running speed of the magnetic tape (magnetic head/relative speed of magnetic tape) was set to 4 m/sec. A metal-in-gap (MIG) head (gap length of 0.15 μm, track width of 1.0 μm) was used as a recording head, and a recording current was set to the optimum recording current of each magnetic tape. As a reproducing head, a giant-magnetoresistive (GMR) head having an element thickness of 15 nm, a shield interval of 0.1 μm, and a reproducing element width shown in Table 3 was used. The signal was recorded at a linear recording density shown in Table 3, the reproduced signal was measured by a spectrum analyzer manufactured by Advantest Corporation, and an output value of a carrier signal was defined as the reproduction output. For the evaluation of the reproduction output, a signal of a portion of the magnetic tape, in which a signal was sufficiently stable after the magnetic tape began running, was used. In a case where the reproduction output is 1.0 dB or more, it can be determined that excellent electromagnetic conversion characteristics are obtained. The reproducing element width shown in Table 3 is a physical dimension of the reproducing element width, and is a value measured by performing observation with an optical microscope or a scanning electron microscope.

TABLE 1

| | | Ferromagnetic powder | | | | | | | | | | | | |
|---|---|---|---|---|---|---|---|---|---|---|---|---|---|---|
| | | Raw material charging amount | | | | | | | | | | | Crystallization temperature | Residual magnetization |
| Medium Type | Type | $H_3BO_3$ [g] | $Al(OH)_3$ [g] | $BaCO_3$ [g] | $Fe_2O_3$ [g] | $SrCO_3$ [g] | $CaCO_3$ [g] | CoO [g] | $TiO_2$ [g] | $Nb_2O_3$ [g] | $Bi_2O_3$ [g] | $Nd_2O_3$ [g] | [° C.] | σr [emu/g] |
| Medium 1 | Ferromagnetic powder A | 797 | 65 | 1636 | 954 | 0 | 0 | 9 | 19 | 0 | 111 | 143 | 610 | 22.1 |
| Medium 2 | Ferromagnetic powder A | 797 | 65 | 1636 | 954 | 0 | 0 | 9 | 19 | 0 | 111 | 143 | 610 | 22.1 |
| Medium 3 | Ferromagnetic powder B | 797 | 65 | 1636 | 954 | 0 | 0 | 9 | 19 | 0 | 111 | 143 | 590 | 20.6 |
| Medium 4 | Ferromagnetic powder C | 649 | 52 | 56 | 1315 | 1665 | 133 | 0 | 0 | 0 | 0 | 0 | 635 | 23.2 |
| Medium 5 | Ferromagnetic powder C | 649 | 52 | 56 | 1315 | 1665 | 133 | 0 | 0 | 0 | 0 | 0 | 635 | 23.2 |
| Medium 6 | Ferromagnetic powder D | 797 | 65 | 1636 | 954 | 0 | 0 | 9 | 19 | 0 | 111 | 143 | 640 | 23.9 |
| Medium 7 | Ferromagnetic powder E | 690 | 97 | 1586 | 1176 | 0 | 0 | 0 | 0 | 0 | 137 | 0 | 610 | 21.5 |
| Medium 8 | Ferromagnetic powder F | 548 | 92 | 1532 | 1416 | 0 | 10 | 0 | 10 | 39 | 0 | 0 | 690 | 23.0 |

TABLE 2

| | Magnetic liquid | | Alignment | Physical property | | Reference value | |
|---|---|---|---|---|---|---|---|
| Medium Type | Type | Bead dispersion condition | Vertical alignment | $Br_{vertical}$ [G] | Thickness of magnetic layer [nm] | Mrt [G · nm] | $Br_{parallel}$ [G] |
| Medium 1 | a | 1 | Present | 1220 | 49.4 | 60268 | 460 |
| Medium 2 | b | 2 | Present | 1070 | 57.5 | 61525 | 350 |
| Medium 3 | b | 2 | Present | 900 | 61.4 | 55260 | 320 |
| Medium 4 | c | 1 | Absent | 1400 | 40.4 | 56560 | 330 |
| Medium 5 | c | 1 | Present | 1830 | 38.5 | 70455 | 280 |
| Medium 6 | a | 1 | Present | 1660 | 37.9 | 62914 | 590 |
| Medium 7 | c | 1 | Present | 1520 | 41.3 | 62776 | 460 |
| Medium 8 | a | 1 | Present | 1310 | 39.3 | 51483 | 570 |

TABLE 3

| | | Evaluation 1 | Evaluation 2 | Evaluation 3 | Reference evaluation |
|---|---|---|---|---|---|
| Recording and reproducing condition | Linear recording density [kbpi] | 510 | 510 | 510 | 510 |
| | Recording bit length per bit in longitudinal direction [nm] | 49.8 | 49.8 | 49.8 | 49.8 |
| | Reproducing element width [μm] | 0.3 | 0.5 | 0.7 | 1.0 |
| | Reproduction bit size S [$nm^2$] | 14941 | 24902 | 34863 | 49804 |
| | $X = -0.01S + 1550$ | 1401 | 1301 | 1201 | 1052 |
| Reproduction output [dB] | Medium 1 ($Br_{vertical}$: 1220 G) | — | 0.7 ($Br_{vertical} < X$) | 1.0 | — |
| | Medium 2 ($Br_{vertical}$: 1070 G) | — | 0.2 ($Br_{vertical} < X$) | 0.5 ($Br_{vertical} < X$) | 1.2 |
| | Medium 3 ($Br_{vertical}$: 900 G) | — | −0.5 ($Br_{vertical} < X$) | 0.0 ($Br_{vertical} < X$) | 1.0 ($Br_{vertical} < X$) |
| | Medium 4 ($Br_{vertical}$: 1400 G) | 0.9 ($Br_{vertical} < X$) | 1.3 | 1.7 | — |
| | Medium 5 ($Br_{vertical}$: 1830 G) | 2.6 | 3.0 | 3.3 | — |
| | Medium 6 ($Br_{vertical}$: 1660 G) | 1.9 | 2.2 | 2.7 | — |
| | Medium 7 ($Br_{vertical}$: 1520 G) | 1.4 | 1.7 | 2.3 | — |
| | Medium 8 ($Br_{vertical}$: 1310 G) | 0.6 ($Br_{vertical} < X$) | 1.1 | 1.4 | — |

From the comparison between the evaluations 1 to 3 shown in Table 3 and the reference evaluation, it can be confirmed that, in a case where the reproduction bit size S is 40,000 $nm^2$ or less, excellent electromagnetic conversion characteristics are obtained in a case where the numerical value of $Br_{vertical}$ of the magnetic recording medium is equal to or more than X calculated from the reproduction bit size S.

One aspect of the present invention is effective in data storage applications.

What is claimed is:

1. A magnetic recording and reproducing device, wherein a reproduction bit size S is 14941 $nm^2$ or more and 34863 $nm^2$ or less, a magnetic recording medium that includes a non-magnetic support and a magnetic layer containing a ferromagnetic powder is provided, a numerical value of a residual magnetic flux density $Br_{vertical}$, which is expressed in a unit G, in a vertical direction of the magnetic recording medium is X or more and 1830 G or less, and the X is a value calculated as $X=-0.01S+1550$.

2. The magnetic recording and reproducing device according to claim 1, wherein the residual magnetic flux density $Br_{vertical}$ is 1250 G or more and 1830 G or less.

3. The magnetic recording and reproducing device according to claim 1, wherein a thickness of the magnetic layer is 50.0 nm or less.

4. The magnetic recording and reproducing device according to claim 1, wherein the ferromagnetic powder is a hexagonal strontium ferrite powder.

5. The magnetic recording and reproducing device according to claim 1, wherein the ferromagnetic powder is a hexagonal barium ferrite powder.

6. The magnetic recording and reproducing device according to claim 1, wherein the magnetic recording medium is a magnetic tape.

7. The magnetic recording and reproducing device according to claim 1, wherein the magnetic recording medium further includes a non-magnetic layer containing a non-magnetic powder between the non-magnetic support and the magnetic layer.

8. The magnetic recording and reproducing device according to claim 1, wherein the magnetic recording medium further includes a back coating layer containing a non-magnetic powder on a surface side of the non-magnetic support opposite to a surface side on which the magnetic layer is provided.

* * * * *